UNITED STATES PATENT OFFICE.

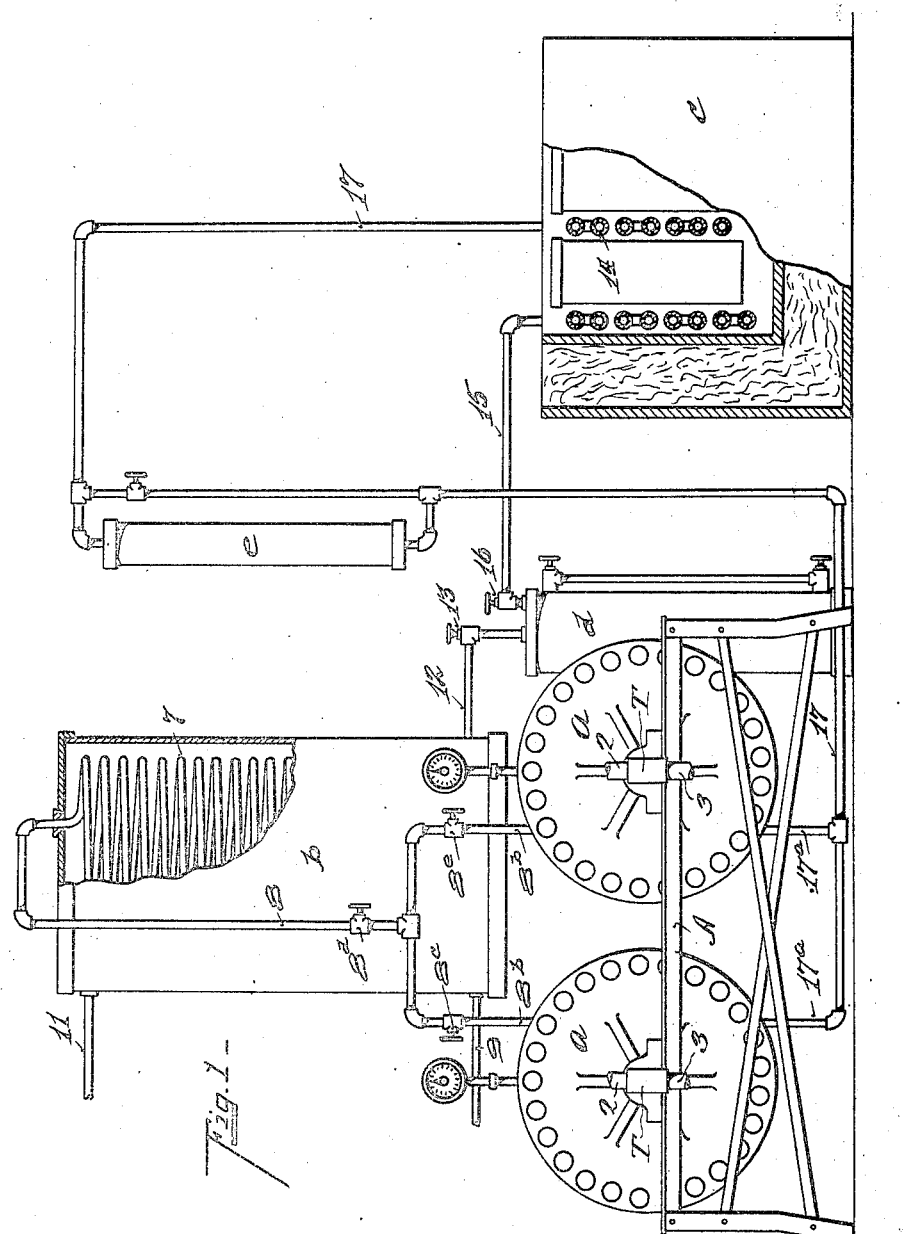

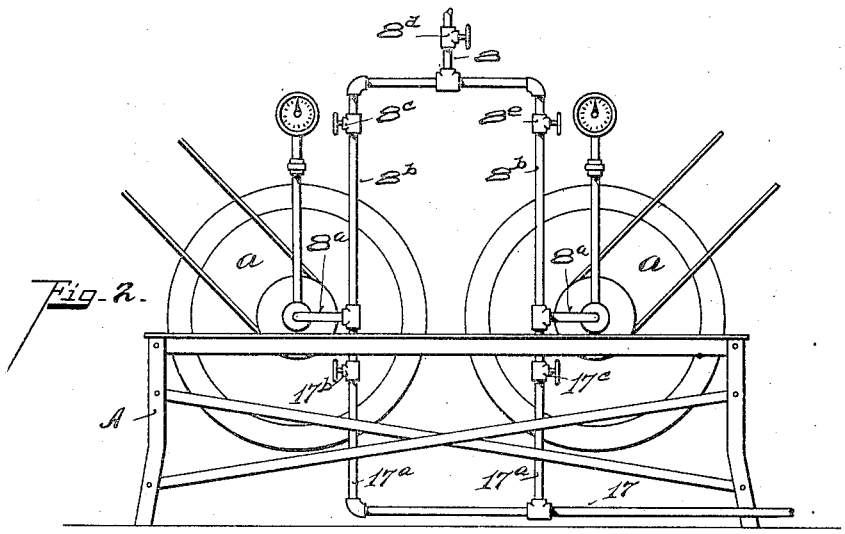
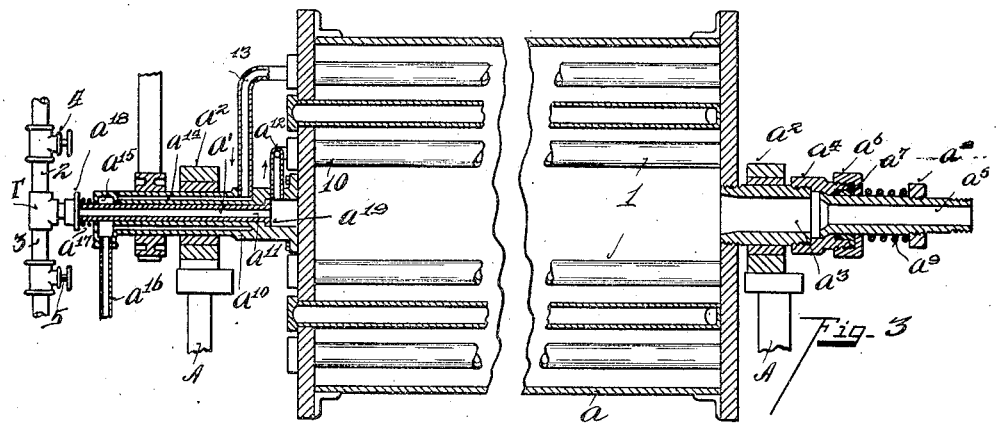
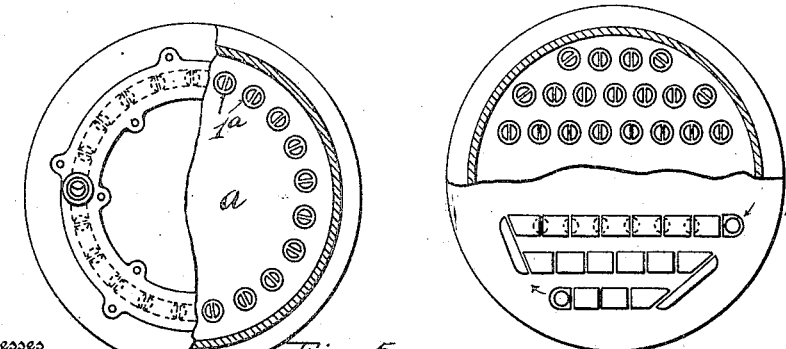

WILLIAM W. SEAY, OF SAN FRANCISCO, CALIFORNIA.

PROCESS OF REFRIGERATION.

941,734.

Specification of Letters Patent.   Patented Nov. 30, 1909.

Application filed January 4, 1909.   Serial No. 470,562.

*To all whom it may concern:*

Be it known that I, WILLIAM W. SEAY, a citizen of the United States, residing at San Francisco, in the county of San Francisco and State of California, have invented certain new and useful Improvements in Processes of Refrigeration, of which the following is a specification.

My invention relates to an improved process in the art of refrigeration.

The basic process is described and claimed in my former application, originally filed March 28th, 1905, Serial No. 252,571, and renewed November 13th, 1907, present Serial No. 401,987. Also the apparatus illustrated herein, forms the subject-matter of a prior application by me, originally filed June 12th, 1906, Serial No. 321,405, and renewed November 13th, 1907, present Serial No. 401,988. Other refinements of the basic process are described and claimed in a separate application by myself filed herewith. The subject-matter of the present invention is to be regarded as belonging to the subject-matter of said other applications but directed to an amplification of the process involving features of practical importance not described or claimed in said other applications.

Briefly summarizing the fundamental process, the expanded refrigerant gas is conducted from the refrigerator into two separate tanks each containing a solid absorbent such as sulfo-cyanid of ammonium—$NH_4CyS$, with which the gas goes into liquid solution, then volatilizing the refrigerant gas from one tank into a condenser, and then from the other tank into the condenser, carrying on the absorption process in one tank under reduced temperature while volatilizing from the companion tank under raised temperature, the liquid refrigerant from the condenser being collected into a reservoir and from thence flowed into the refrigerator for expansion. Of course, the number of tanks to be employed is optional. I have found that when the expanded refrigerant gas is brought into the presence of the solid absorbent the first absorption is comparatively rapid, and that after a certain proportion, say, the first half of a given charge of refrigerant is absorbed, the absorption of the remainder of the charge is relatively slower. Conversely in the volatilizing operation, the first half of the refrigerant is readily driven off from the liquid solution upon the application of a moderate degree of heat, but the residue of the absorbed refrigerant is more slowly driven off and incompletely. During the first half of this volatilizing period the refrigerant gas is readily expelled into the condenser, and at the end of the first half of this period the residue of the refrigerant charge cannot be as economically expelled into the condenser. At this period the companion tank has absorbed its charge of the refrigerant gas at a reduced temperature and relatively low pressure, so that the conditions in the two tanks represent the extremes, at this stage of the operation I shut off communication between the first tank and condenser, and open communication between the two tanks continuing to apply heat to the first tank and to apply cold, (relative), to the second tank until the residue of refrigerant is volatilized from the solution of the first tank into the second tank, that is transferred from the zone of high pressure and temperature of the first tank into the zone of low pressure and temperature existing in the second tank. In this way the residue absorbent in the first tank can be economically, readily and substantially entirely separated from its charge of refrigerant, so as to be in the best condition for rapidly and actively absorbing the next charge of expanded refrigerant gas from the refrigerator. I then volatilize from the second tank a given portion of the refrigerant into the condenser and the residue into the first tank for reabsorption into the liquid solution formed by the chemical and the succeeding charge of expanded gas from the refrigerator. In this manner, instead of attempting to expel this residue of ammonia into the condenser, I alternately shift it from one tank to the other, so that the dry and solid absorbent is always exposed to the fresh charge of expanded gas in its most efficient condition. This helps the process in both the absorbing and the volatilizing steps, the gas being more readily absorbed by the solid chemical than by a chemical from which the refrigerant has not been substantially or completely expelled, and the refrigerant being volatilized from the supercharged solution, (that is, the original charge of gas from the refrigerator plus the residue of refrigerant expelled from the opposite tank), than from a solution containing only the refrigerant received directly from the refrigerator.

A typical apparatus for carrying on the process is illustrated in the description of the accompanying drawings, forming a part of this specification, in which:—

Figure 1 is a front elevation with parts in section. Fig. 2 is a partial rear elevation. Fig. 3 is a central longitudinal section through one of the generators. Fig. 4 is a view of one of the generators partially in section. Fig. 5 is a sectional detail of a modification.

Referring by reference character to this drawing, $a$, $a$, designate the absorbing and generating tanks, which may conveniently be of cylindrical form, and of which I prefer to use two for the purpose which will hereinafter appear. These tanks have hollow trunnions $a'$ which are journaled in suitable bearings $a^2$ on a suitable supporting frame A. Each has an interior coil which is in communication through the hollow trunnion at one end by means of suitable pipe connections with the hot and cold water supply pipes 2 and 3 provided with suitable cocks 4 and 5 by which hot or cold water can be supplied to the coil in alternation as desired. The interior of each tank or generator is in communication through its hollow trunnion by a short pipe section $8^a$ with branch pipes $8^b$ which unite in or are connected to the pipe 8 and which leads to a condenser $b$. The condenser $b$ is a tank having an interior coil 7, which is in connection with the pipe 8. The condenser tank has an inlet pipe 9 and an outlet pipe 11 for the condensing water. The condenser coil 7 is connected to a receiver $d$ for the liquid anhydrous ammonia by pipe 12 having a suitable cock 13.

A refrigerator is indicated at $c$ which may be of the ordinary or any desired construction according to its destined employment for making ice or for cooling storage chambers as used in the arts generally. For convenience I have shown this refrigerator as a freezing tank adapted to be filled with brine and to receive cans and having an interior coil 14 which is connected to the receiver $d$ by pipe 15 having an expansion cock 16. Through this pipe 15 the anhydrous liquid ammonia is supplied to the refrigerator. The other end of the coil 14 communicates by a pipe 17 and branch pipes $17^a$ with the pipes $8^a$ leading into the tanks $a$, suitable stop cocks $17^b$, $17^c$, being provided in these pipes $17^a$.

$8^c$ and $8^e$ are cocks in the pipes $8^b$, and $8^d$ is a cock in the pipe 8, which control communication between the tanks, and also between the tanks and the condenser.

If desired, I may pass the expanded ammonia vapor going through the pipe 17 through a drier, $e$ connected to the pipe 17 by branch pipes as shown, but if perfectly anhydrous ammonia is used, such a drier will not be needed.

I find it very desirable to arrange the coil 1 within each tank $a$ in a circular or annular form, as shown at $1^a$ in Fig. 5, and to provide means by which each tank may be continuously rotated during the absorbing action.

The trunnion through which the refrigerant is introduced is shown on the right of Fig. 3. It comprises a tubular member $a^3$ journaled in the bearing $a^2$ to which is connected a coupling member $a^4$ having an internal flange engaging a corresponding external flange on the pipe section $a^5$, which connects with the branch $8^a$. The section $a^5$ is surrounded by a collar $a^6$ which has a flange screwed on to the coupling member $a^4$. Between this collar and coupling member is located a suitable packing material $a^7$. A second collar $a^8$ is rigidly but adjustably secured on the pipe $a^5$ and between it and the collar $a^6$ is located a helical spring $a^9$ which tends to keep the flange on the inner end of pipe $a^5$ pressed against the internal flange of coupling member $a^4$.

The particular means by which the heating and cooling medium is supplied is shown on the left of Fig. 3.

The shaft $a^{10}$ which is secured rigidly to the head of the tank or drum has a central longitudinal passage $a^{11}$ at one end which is in communication at its outer end by a suitable T coupling with the pipes 2 and 3. At its inner end this passage communicates by a lateral branch $a^{12}$ with one end of the coil 10. The other end of the coil communicates by a pipe $a^{13}$ with a passage $a^{14}$ in the member $a^{10}$. This passage at its outer end communicates with a junction box or casing $a^{15}$ which has a waste pipe $a^{16}$. A spring $a^{17}$ located between a collar $a^{18}$ on pipe $a^{11}$ and the junction box serves the double function of keeping the flanged end $a^{19}$ of the pipe $a^{11}$ pressed against a corresponding flange or shoulder of the shaft $a^{10}$, and holding the junction box against the end of shaft or trunnion $a^{10}$ to effect a tight joint.

In starting the operation the cocks $17^b$, $17^c$, are closed and also the cocks $8^c$, $8^e$, thereby shutting off the tanks from communication with both the refrigerator and the condenser. Say one hundred pounds of sulfocyanid of ammonium or the nitrate of ammonium are placed in each tank, the cocks $17^b$, $17^c$, are now open and the expanded ammonia gas from the refrigerator is allowed to flow into said tank until a pressure of about forty-five (45) pounds per square inch absolute is reached, (if making ice). The chemical in each tank will absorb this charge of the refrigerant gas and go into liquid solution, the ammonia figuring at about forty-five (45) pounds avoirdupois weight, and the tanks are maintained at about 60° Fahrenheit temperature. The cocks $17^b$, $17^c$, are now closed. Heat is now applied to one of the tanks, say, the left hand tank, by passing warm water through the coil thereof, the cock 8ᶜ being open and the cock 8ᵈ being open, so that the ammonia liberated by the solution will pass into the condenser $b$. From the condenser it is liquefied and flows into the reservior $d$ from which it is again passed into the refrigerator $c$ for cooling. The first twenty (20) or twenty-five (25) pounds of ammonia will be quickly and readily volatilized from the solution in the tank in which it is heated, the absorbent being resolidified, but the residue of the ammonia amounting to substantially twenty (20) to twenty-five (25) pounds, say, will be retained by the absorber and cannot be so readily or economically driven into the condenser. Therefore, in order to expel this residue refrigerant from the first tank at the least cost in time and fuel, I prefer to drive it over to the other absorber tank to be there absorbed in the solution already formed. For this purpose, the cock 8ᵈ is closed, shutting off the communication from the condenser to both tanks, and the cock 8ᵉ is opened establishing communication between the two tanks. The ammonia and the chemical in the first tank being hot, (160 to 180° F.), and under a gage pressure of from one hundred (100) to one hundred and twenty (120) pounds per square inch, will rapidly flow from tank one to tank two, the latter being kept at about 60° F., enables the refrigerant volatilized from tank one to be rapidly absorbed into the solution in tank two, forming an overcharged solution as it were. That is, tank two having previously absorbed about forty-five (45) pounds in weight of ammonia, will absorb the additional twenty-five (25) pounds of the ammonia expelled from tank one, making in tank two a charge of approximately seventy (70) pounds in weight of ammonia, held in liquid solution with the chemical absorbent. When the pressure between the two tanks has been equalized, the process is reversed, that is, cock 8ᵈ is opened so as to place tank two in communication with the condenser $b$, and cock 8ᵉ is closed to shut off the first tank from the condenser. The second tank is shut off from communication with the refrigerator, and it is heated to volatilize the refrigerant from its solution into the condenser, and the first tank is cooled and placed in communication with the refrigerator to receive another charge of the expanded refrigerant gas. The chemical in tank one being dry, and substantially free from ammonia, is in a condition which may be likened to a "nascent" condition, that is, it has an intense affinity for the ammonia from the refrigerator, and it will rapidly take up its charge of, say, forty-five (45) pounds by weight of ammonia. The tank two now contains seventy (70) pounds by weight of ammonia in its solution, and the first fifty pounds thereof will be readily volatilized upon the application of heat and the increment of pressure, the residue being, as before described, very much less readily separated. When tank one has absorbed its charge, and the first fifty (50) pounds of ammonia has been expelled from the second tank, the residue of twenty (20) pounds is exchanged again from the second tank into the first tank where it is reabsorbed. In this way, the residue of refrigerant is bodily shifted from one tank to the other instead of being passed into the condenser, thus substantially providing a clean and pure body of the chemical in each tank prior to its absorbing period, accelerating instead of retarding the process. Preferably, the tanks are rotated to bodily shift the position of the solid absorbent relative to the incoming gas in order to present the absorber in its most efficient condition, and, preferably, the tanks are rotated or rocked, during the absorbing periods, to increase the efficiency of this step. These features, however, form the subject-matter of another application by myself. About the highest pressure permissible in the refrigerator for ice making purposes is forty-five (45) pounds per square inch absolute, one hundred (100) pounds of chemical under this pressure and kept at about 60° F. temperature, will absorb and liquefy about forty-five (45) pounds ammonia in a reasonable period of time. This method of transferring the residue of twenty (20) to twenty-five (25) pounds ammonia at the high temperature and pressure of the condensing stage, to the other cold tank after it has absorbed its quantum of ammonia direct from the refrigerator, permits of a yield of about forty-five (45) pounds weight at each condensation, at a very much less expenditure of heat and time, and leaves the chemical in a much more desirable physical condition for the next absorption than to attempt the recovery of all the ammonia at the one condensation. This alternate transfer of the ammonia residue from one tank to the other, under the circumstances described, makes a decided gain in the size of apparatus necessary, the time occupied in the absorption, and the condensation, and the fuel expended.

Having described my invention, I claim:—

1. In the art of refrigeration, the process of combining the expanded refrigerant gas after refrigeration with two bodies of a solid absorbent contained in separate tanks, a liquid solution being formed, heating and volatilizing a portion of the refrigerant from the solution under compression in the first tank and delivering the gas into a condenser, the other tank being under relatively low temperature and low pressure, then shutting off communication between the first tank and the condenser, opening communication between the two tanks, heating and volatilizing substantially the residue of the refrigerant from the solution in the first tank into the second tank and absorbing it into the solution previously formed there, then absorbing another charge of expanded refrigerant gas in the first tank under reduced temperature, heating and volatilizing off a portion of the refrigerant gas from the second tank into the condenser, and then heating and volatilizing the residue of refrigerant from the solution in the second tank into the solution formed in the first tank, substantially as described.

2. In the art of refrigeration, the process of combining expanded refrigerant gas with a solid absorbent in two tanks a liquid solution being formed, heating and volatilizing the refrigerant from the solution in one tank, first into a condenser and then into the companion tank, while under low pressure, and then reversing the steps, whereby the residue of refrigerant in the solution in each tank after the first volatilizing period is reabsorbed into the solution of its companion tank, substantially as described.

3. In the art of refrigeration, the process of volatilizing the refrigerant from a liquid solution with a solid absorbent in one tank under raised temperature while absorbing expanded refrigerant gas into solution in a second tank under reduced temperature, the first portion of the gas volatilized from the solution being alternately delivered from said tanks into a condenser, and the residue of the charge from each tank being alternately delivered into the other tank and reabsorbed there with the solution formed by the chemical and the expanded gas from the refrigerator, substantially as described.

In testimony whereof, I have hereunto set my hand.

WILLIAM W. SEAY.

Witnesses:
OLIVER B. KAISER,
S. BECK.